(12) United States Patent
Gibson

(10) Patent No.: US 8,654,125 B2
(45) Date of Patent: Feb. 18, 2014

(54) SYSTEM AND METHOD OF CHART DATA LAYOUT

(75) Inventor: Stephen Gibson, Kemptville (CA)

(73) Assignee: International Business Machines Corporation, Armonk, NY (US)

( * ) Notice: Subject to any disclaimer, the term of this patent is extended or adjusted under 35 U.S.C. 154(b) by 1106 days.

(21) Appl. No.: 11/473,376

(22) Filed: Jun. 22, 2006

(65) Prior Publication Data

US 2008/0010589 A1   Jan. 10, 2008

(51) Int. Cl.
*G06T 11/20* (2006.01)
*G06F 17/30* (2006.01)

(52) U.S. Cl.
USPC ............................................... 345/440

(58) Field of Classification Search
CPC .................. G06F 17/30398; G06T 11/206
USPC .......................................................... 345/440
See application file for complete search history.

(56) References Cited

U.S. PATENT DOCUMENTS

| | | | |
|---|---|---|---|
| 5,852,819 A * | 12/1998 | Beller | 707/1 |
| 7,015,911 B2 * | 3/2006 | Shaughnessy et al. | 345/440 |
| 7,249,328 B1 * | 7/2007 | Davis | 715/853 |
| 7,251,693 B2 * | 7/2007 | Stull et al. | 709/225 |
| 7,421,648 B1 * | 9/2008 | Davis | 715/234 |
| 2003/0212960 A1 * | 11/2003 | Shaughnessy et al. | 715/526 |
| 2005/0068320 A1 * | 3/2005 | Jaeger | 345/440 |
| 2005/0198042 A1 * | 9/2005 | Davis | 707/10 |
| 2006/0004718 A1 * | 1/2006 | McCully et al. | 707/3 |
| 2006/0190439 A1 * | 8/2006 | Chowdhury et al. | 707/3 |
| 2007/0101255 A1 * | 5/2007 | Garg et al. | 715/509 |
| 2008/0046805 A1 * | 2/2008 | Shewchenko et al. | 715/215 |

* cited by examiner

*Primary Examiner* — Jeffery A Brier
(74) *Attorney, Agent, or Firm* — Shumaker & Sieffert, P.A.

(57) ABSTRACT

A chart data layout system and method of processing chart data in a report is provided. An example chart data layout system comprises a query module for decomposing required data into required data queries, a chart layout module for rendering a chart based upon chart data received from the queries, a category module for displaying category aggregate information in a category location of a chart, and a series module for displaying series aggregate information in a series location of the chart. An example method comprises decomposing required data into queries, retrieving queried data, rendering a chart based upon the queried data, rendering category information on a category label of the chart based upon queried data, and rendering series information on a series label of the chart based upon queried data.

13 Claims, 5 Drawing Sheets

SYSTEM AND METHOD OF CHART DATA LAYOUT

FIELD OF INVENTION

The present invention relates to report layouts, and in particular to a system and method of chart data layout.

BACKGROUND OF THE INVENTION

Business users need to consume a large amount of information quickly. With limited time to make decisions, they require information in a quick and easy to understand format. FIG. 1 illustrates a typical chart 10 prepared by a business intelligence reporting system. The chart 10 shows revenue for each region and year. However, this chart 10 may not have enough information. The business user may also need to know what the growth was from year to year. They may also require information regarding which territories contributed the most revenue overall.

In the past, business users would have to consume several charts or tables of data to get the information they require. This made the process of understanding the data both time consuming and error prone. Traditional charts are limited in space. They may miss some information. To provide all the information required in traditional charting methods can produce complex or long reports. It can also be difficult for a reader of the report to understand the relationships between disjoint data.

SUMMARY OF THE INVENTION

This invention sets out to provide the business user with new chart capabilities that can convey this additional information in a clear and concise manner.

In accordance with an embodiment of the present invention, there is provided a chart data layout system for processing chart data in a report. The chart data layout system comprises a query module for decomposing required data into required data queries, a chart layout module for rendering a chart based upon chart data received from the queries, a category module for displaying category aggregate information in a category location of a chart, and a series module for displaying series aggregate information in a series location of the chart.

In accordance with another embodiment of the present invention, there is provided a method of processing chart data in a report. The method comprises the steps of decomposing required data into queries, retrieving queried data, rendering a chart based upon the queried data, rendering category information on a category label of the chart based upon queried data, and rendering series information on a series label of the chart based upon queried data.

In accordance with another embodiment of the present invention, there is provided a memory containing computer executable instructions that can be read and executed by a computer for caring out a method of processing chart data in a report. The method comprises the steps of decomposing required data into queries, retrieving queried data, rendering a chart based upon the queried data, rendering category information on a category label of the chart based upon queried data, and rendering series information on a series label of the chart based upon queried data.

In accordance with another embodiment of the present invention, there is provided a carrier carrying a propagated signal containing computer executable instructions that can be read and executed by a computer. The computer executable instructions are to execute a method of processing chart data in a report. The method comprises the steps of decomposing required data into queries, retrieving queried data, rendering a chart based upon the queried data, rendering category information on a category label of the chart based upon queried data, and rendering series information on a series label of the chart based upon queried data.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

Figure 1:
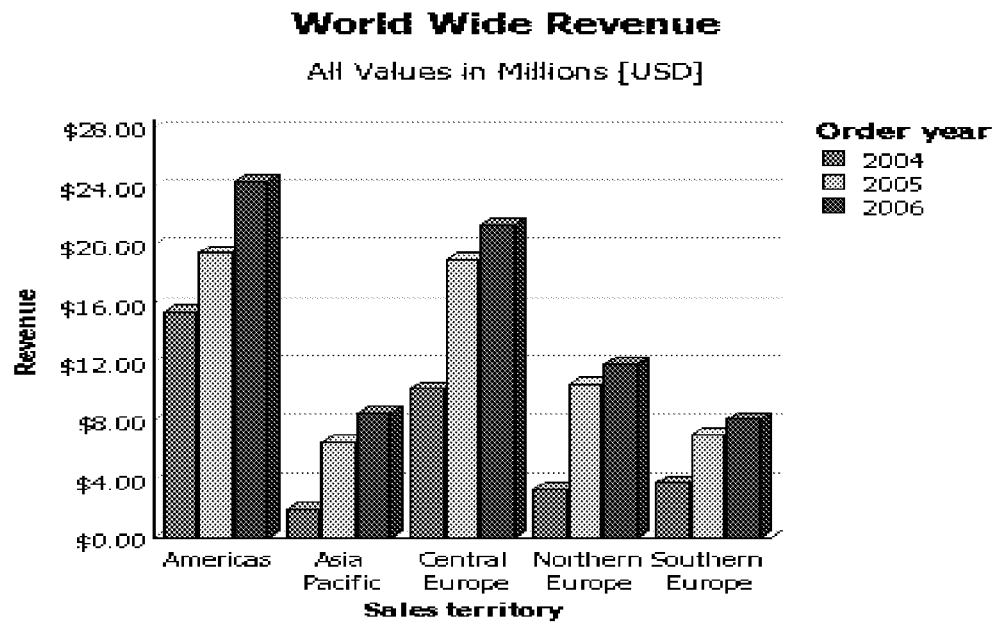
FIG. 1 is a typical chart that shows revenue for years and location.

Charts display information in a graphical manner. They are an effective means to display a large amount of information quickly to a business user. Common types are bar or column charts which show numerical information for category and series information. FIG. 1 is a typical chart that shows revenue for years and location. The data that is shown in this chart is illustrated in Table 1 below:

TABLE 1

| Revenue | 2004 | 2005 | 2006 |
|---|---|---|---|
| Americas | $15.41 | $19.47 | $24.33 |
| Asia Pacific | $2.01 | $6.54 | $8.53 |
| Central Europe | $10.21 | $19.04 | $21.42 |
| Northern Europe | $3.34 | $10.50 | $11.89 |
| Southern Europe | $3.78 | $7.00 | $8.10 |

Consider the case were the business users needs to see the revenue information in the about chart, but also needs to see total revenue for each year, the percentage of revenue each territory contributed to the total and the total revenue for all years and all regions. An example of how this is typically shown is included in FIG. 1. Table 2 shows the basic revenue information in a clear and easy to consume manner.

TABLE 2

| Revenue | 2004 | 2005 | 2006 | Total for all years |
|---|---|---|---|---|
| Americas | $15.41 | $19.47 | $24.33 | $59.22 |
| Asia Pacific | $2.01 | $6.54 | $8.53 | $17.08 |
| Central Europe | $10.21 | $19.04 | $21.42 | $50.67 |
| Northern Europe | $3.34 | $10.50 | $11.89 | $25.72 |
| Southern Europe | $3.78 | $7.00 | $8.10 | $18.88 |
| Total for all regions | $34.75 | $62.56 | $74.27 | $171.58 |

The crosstab shows the overall total for all years and all regions. It also shows the totals for each year.

TABLE 3

| | Share of Total |
|---|---|
| Americas | 34.51% |
| Asia Pacific | 9.96% |
| Central Europe | 29.53% |
| Northern Europe | 15.00% |
| Southern Europe | 11.00% |

This crosstab shows the portion of revenue that each provided.

Figure 2:
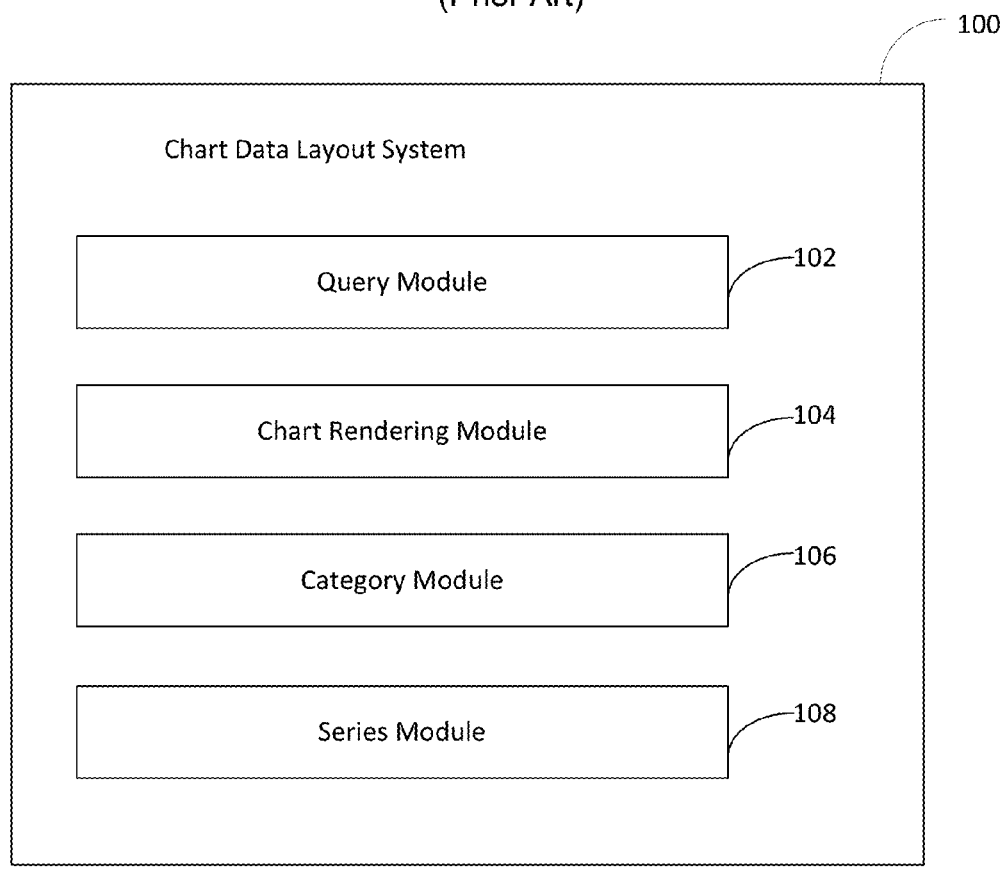
FIG. 2 shows in a component diagram an example of a chart data layout system, in accordance with an embodiment of the present invention.

FIG. 2 shows in a component diagram an example of a chart data layout system 100, in accordance with an embodiment of the present invention. The chart data layout system 100 (or rendering engine) comprises a query module 102 for decomposing required data into required data queries, a chart layout module 104 for rendering a chart based upon chart data received from the queries, a category module 106 for displaying category aggregate information in a category location of a chart, and a series module 108 for displaying series aggregate information in a series location of the chart.

Through the use of a report specification and a query engine, the chart data layout system 100 (or charting engine) can determine how to calculate the values that the author wants. For example, by placing a reference to Revenue in the chart title, the chart data layout system 100 understands this to mean total revenue. If a reference to Revenue is placed in the legend, the chart data layout system 100 understands this to mean total revenue for each item in the legend.

Figure 3:
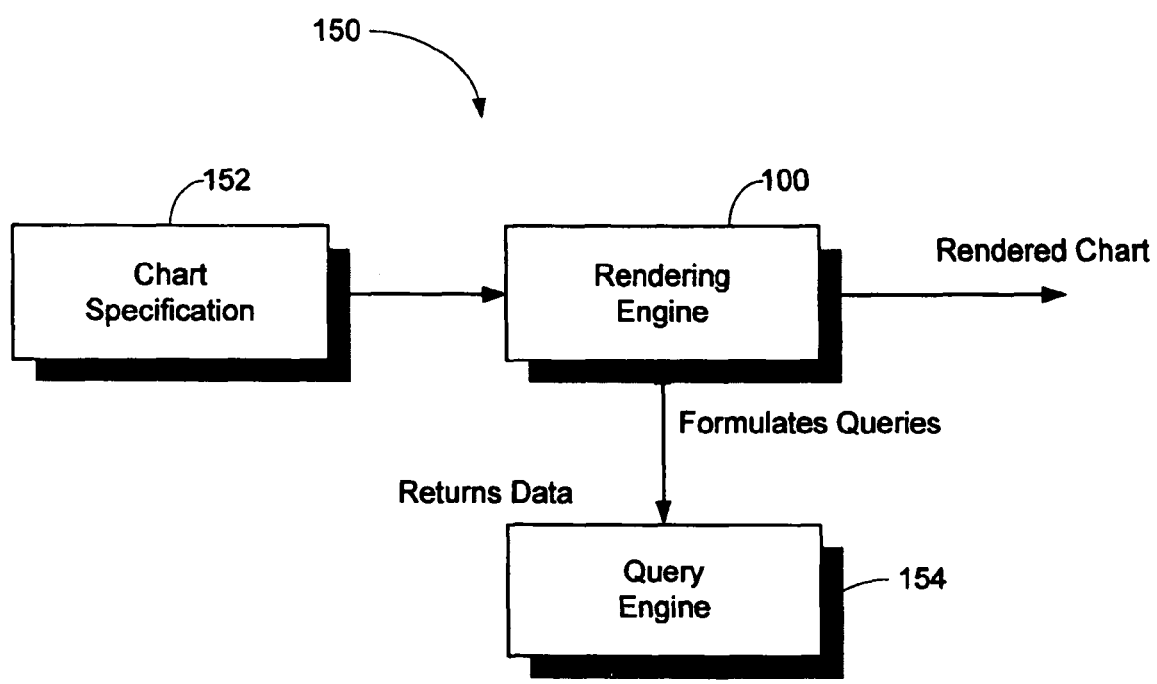
FIG. 3 shows in a process flow diagram an example of a process of rendering chart data, in accordance with an embodiment of the chart data layout system.

In addition to the fact that this type of information can be displayed in the chart, the simplicity with which this chart can be created is also part of the chart data layout system 100. FIG. 3 shows in a process flow diagram 150 an example of a process of rendering chart data, in accordance with an embodiment of the chart data layout system 100. Here a chart specification 152 is created by the actions of an author. Based on which values the author wishes to see and where, the actions are captured by the authoring tool (not shown). When the chart is run, the rendering engine (chart data layout system 100) interprets the specification and formulates one or more queries which are then sent to a query engine 154 for execution. The resulting data is then rendered into the chart at the appropriate location.

Figure 4:
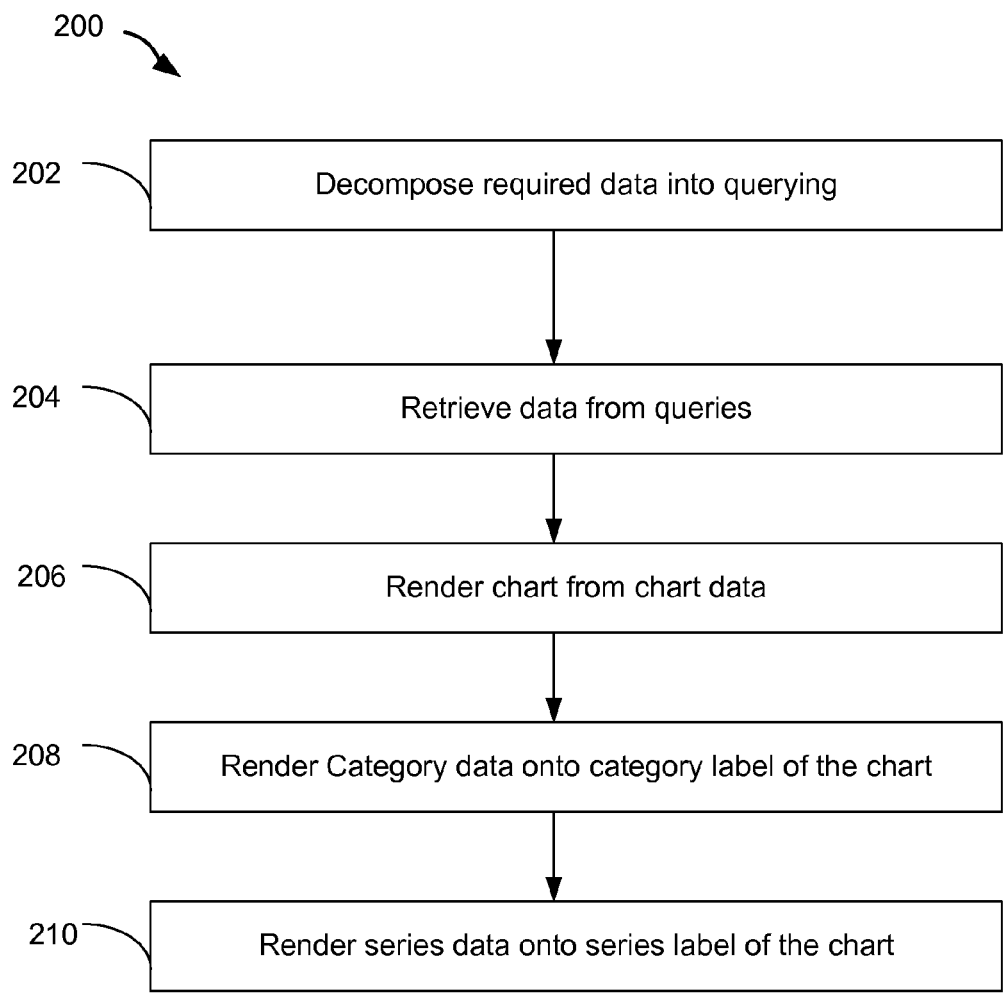
FIG. 4 shows in a flowchart an example of a method of chart data layout processing, in accordance with an embodiment of the chart data layout system.

FIG. 4 shows in a flowchart an example of a method of chart data layout processing (200), in accordance with an embodiment of the chart data layout system 100. A report author specifies which aggregates are to appear in the category and series labels. Based on the report author specifications, the data required for the chart is decomposed into several queries (202). One query is used for the chart data, and one query is used for each aggregate to be displayed in the category and series labels. The query for the aggregates in the category label includes the category and the aggregate. The same is true for the series. Once the data has been retrieved (204), a rendering component takes the data from the chart and plots the chart as normal (206). The rendering component also takes the data from queries related to the category label and places the category data appropriately in the chart before the chart is finally rendered (208). Finally, the series component also takes the data from queries related to the series label and places the series data appropriately in the chart before the chart is finally rendered (210). Other steps may be added to the method (200), such as decomposing the chart into further queries for headers, footers, legends, titles and subtitles and rendering data retrieved from the further queries into their location on the chart as set out in the report specification.

Figure 5:
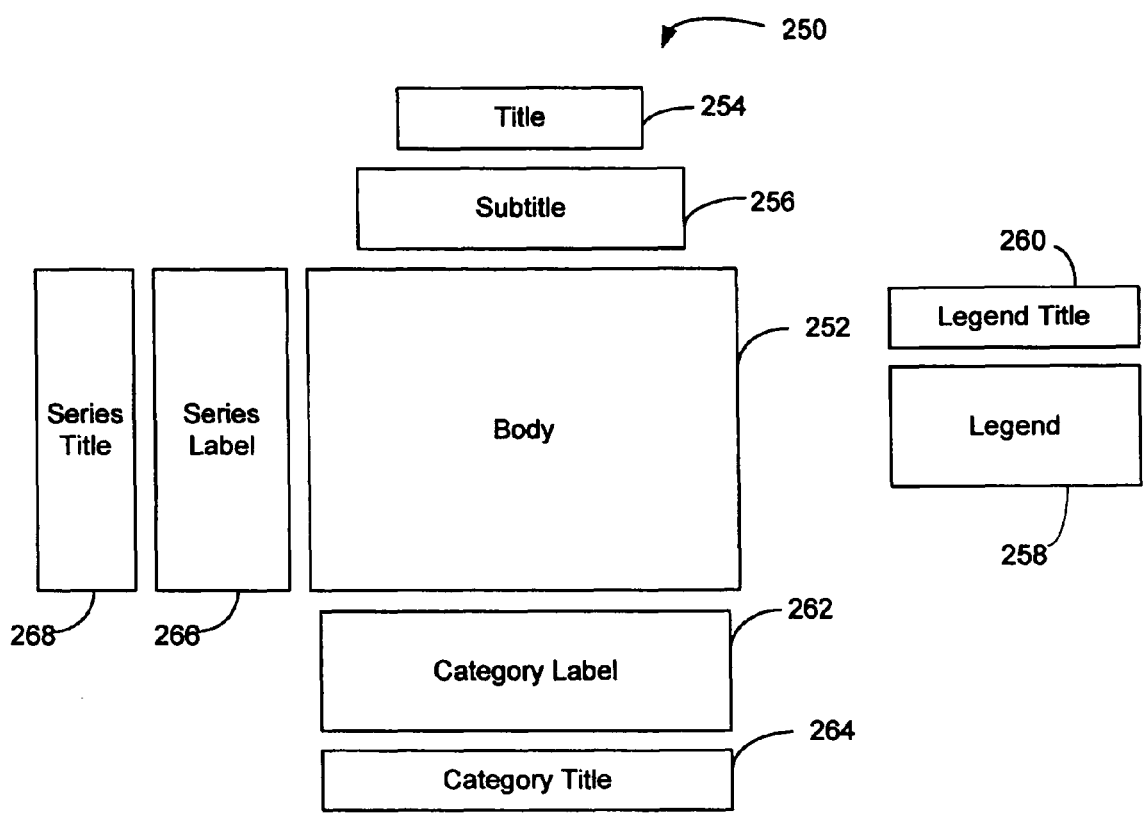
FIG. 5 shows in a component diagram an example of a chart layout, in accordance with an embodiment of the chart data layout system.

The concept of adding information to category and series labels can also be expanded to other areas of the chart, including legends and labels. FIG. 5 shows an example of a chart layout 250 showing areas where information (including aggregates) can be added. The chart layout 250 comprises a body 252 optionally having a body title 254 and body sub-title 256, a legend 258 optionally having a title 260, a category label 262 optionally having a category title 264, and a series label 266 optionally having a series title 268. To supplement the information in the chart layout 250, aggregates may be inserted into the legend 258, category label 262 and series label 266, Additionally, headers and footers along with their titles can also be added to the chart layout 250.

A reports specification 152 defines the types of values that are to be placed in the chart layout areas. For example, a total could be placed in the title, an average could be placed in the footer and a percentage growth calculation could be placed in the series. As is appreciated, the report specification 152 includes references to an underlying metadata model, which in turn references a repository or database.

The query decomposition module 102 determines the additional queries (along with their definitions) that are to be executed in order to provide the correct information and in the correct area of the chart layout. The query module 102 uses the references to the metadata model, along with the location of the requested data in the chart to build the additional queries. Preferably, one query is created for each chart layout area.

The query engine 154 then runs the queries and fetches the data in a table format. The chart data layout system 100 uses the report specification 152 and the fetched data to determine where to render each number or value on the chart.

Figure 6:
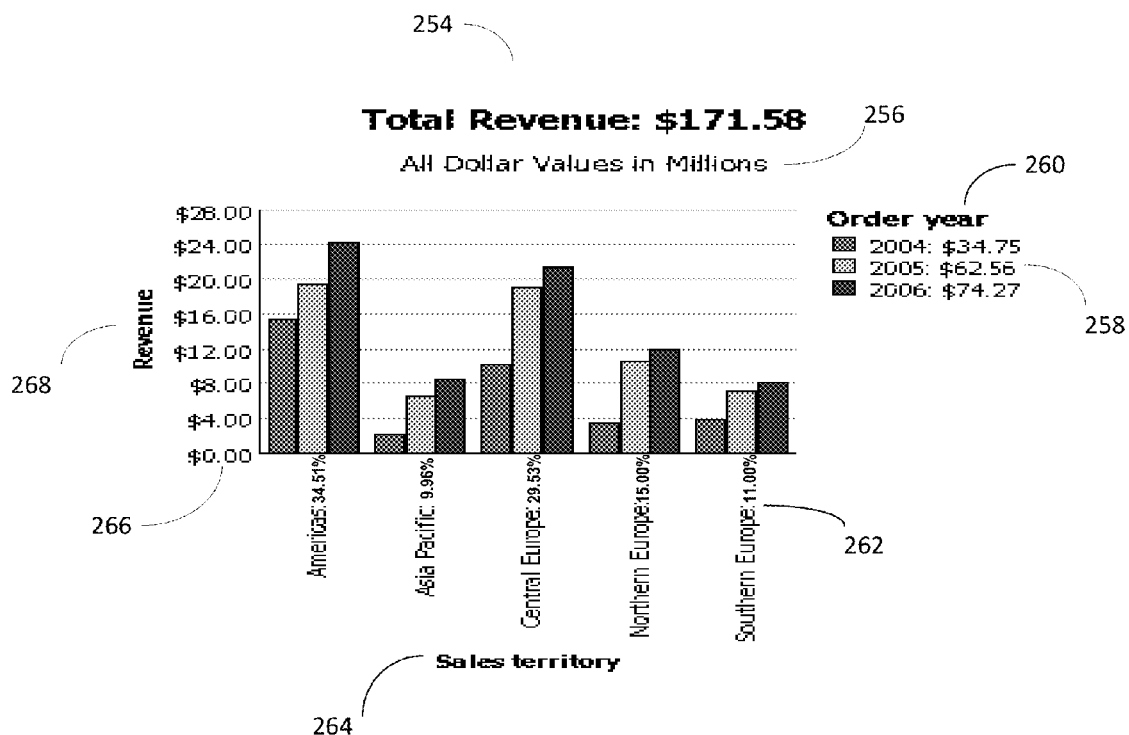
FIG. 6 shows in a chart an example of combinations of the desired information into a single format.

Advantageously, the chart data layout system 100 and method shows additional aggregate information on the chart. This is more compact and easier to read. It allows business users to quickly understand their data and make appropriate decisions. FIG. 6 shows in a chart an example of combinations of the desired information into a single format. Additional crosstab information can be rendered on a chart for consumption. Calculations unrelated to the chart data can be rendered on the chart. Advantageously, the report specification author does not have to work out the complex query logic to obtain the correct results as this is handled by the rendering engine.

The chart data layout system 100 and methods of the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal and its carrier are also within the scope of the present invention, as well as the hardware, software and the combination thereof.

The present invention has been described with regard to one or more embodiments. However, it will be apparent to persons skilled in the art that a number of variations and modifications can be made without departing from the scope of the invention as defined in the claims.

What is claimed is:

1. A method of processing chart data in a report, the method comprising:
    receiving a report specification that outlines aggregates to appear in a category label of a chart, wherein the report specification defines types of values for required data to be placed in different layout areas of the chart, wherein the different layout areas include the category label of the chart, and wherein the report specification defines locations of the different layout areas of the chart for the required data;
    interpreting, by a computer comprising at least one processor, the report specification;
    creating, by the computer and based upon interpretation of the report specification, multiple distinct queries that each correspond to one of the different layout areas of the chart, wherein the queries include (1) a chart data query to obtain chart data to be used for the chart and (2) one or more category data queries to obtain category aggregates for inclusion in the category label of the chart, wherein the category aggregates include supplemental values calculated based on the chart data;
    retrieving the chart data for the chart data query;
    retrieving the category aggregates for the one or more category data queries;
    rendering, by the computer, the chart data, wherein the chart data is rendered into the chart at a location that is defined by the report specification;
    rendering, by the computer, the category aggregates, wherein the category aggregates are rendered into the chart at a category location of the category label that is defined by the report specification; and
    displaying, by the computer, the category aggregates in the category location of the chart.

2. The method as claimed in claim 1, further comprising rendering, by the computer, one or more of:
    a title of the chart in a title layout area;
    a subtitle of the chart in a subtitle layout area;
    a legend of the chart in a legend layout area;
    a legend title of the legend of the chart in a legend title layout area;
    a header of the chart in a header layout area; and
    a footer of the chart in a footer layout area.

3. The method as claimed in claim 2, wherein the report specification further outlines aggregates that are to appear in one or more of the header, legend, and footer of the chart, and wherein the queries further include:
    one or more header queries to obtain header aggregates for inclusion in the header layout area of the chart, wherein the header aggregates include supplemental values calculated based on the chart data;
    one or more legend queries to obtain legend aggregates for inclusion in the legend layout area of the chart, wherein the legend aggregates include supplemental values calculated based on the chart data; and
    one or more footer queries to obtain footer aggregates for inclusion in the footer layout area of the chart, wherein the footer aggregates include supplemental values calculated based on the chart data.

4. The method as claimed in claim 3, further comprising:
    rendering, by the computer, the header aggregates, the legend aggregates, and the footer aggregates in response to the one or more header queries, the one or more legend queries, and the one or more footer queries, wherein the header aggregates, the legend aggregates, and the footer aggregates are rendered into the chart at their respective locations as defined by the report specification.

5. The method as claimed in claim 1, wherein the supplemental values comprise percentage values, calculated based on the chart data, for each category with respect to a total for all categories.

6. The method as claimed in claim 1, wherein the supplemental values comprise sum values, calculated based on the chart data, for all subcategory values of each category.

7. The method as claimed in claim 1, wherein the supplemental values comprise average values, calculated based on the chart data, for all subcategory values of each category.

8. A chart data layout system for processing chart data in a report, the chart data layout system comprising:
    a computer comprising at least one processor,
        wherein the computer is programmed to receive a report specification that outlines aggregates to appear in a legend label of a chart,
        wherein the report specification defines types of values for the required data that are to be placed in different layout areas of the chart,
        wherein the different layout areas include the legend label of the chart,
        wherein the report specification defines locations of the different layout areas of the chart for the required data,
        wherein the computer is programmed to interpret the report specification,
        wherein the computer is programmed to create, based upon interpretation of the report specification, multiple distinct queries that each correspond to one of the different layout areas of the chart, wherein the queries include (1) a chart data query to obtain chart data to be used for the chart and (2) one or more legend data queries to obtain legend aggregates for inclusion in the legend label of the chart,
        wherein the legend aggregates include supplemental values calculated based on the chart data,
        wherein the computer is programmed to retrieve the chart data for the chart data query,
        wherein the computer is programmed to retrieve the legend aggregates for the one or more legend data queries,
        wherein the computer is programmed to render the chart data,
        wherein the chart data is rendered into the chart at a location that is defined by the report specification,
        wherein the computer is programmed to render the legend aggregates,
        wherein the legend aggregates are rendered into the chart at a legend location of the legend label that is defined by the report specification, and
        wherein the computer is programmed to display the legend aggregates in the legend location of the chart.

9. The chart data layout system as claimed in claim 8, further comprising one or more of:
    a title module to display title aggregates in a title location of the chart that is defined by the report specification;
    a subtitle module to display subtitle aggregates in a subtitle location of the chart that is defined by the report specification;

a header module to display header aggregates in a header location of the chart that is defined by the report specification;

a footer module to display footer aggregates in a footer location of the chart that is defined by the report specification; and a legend module to display legend aggregates in a legend location of the chart that is defined by the report specification.

10. A non-transitory memory containing computer executable instructions that are executed by at least one processor of a computer to:

receive a report specification that outlines aggregates to appear in a category label of a chart, wherein the report specification defines types of values for required data to be placed in different layout areas of the chart, wherein the different layout areas include the category label of the chart, and wherein the report specification defines locations of the different layout areas of the chart for the required data;

interpret the report specification;

create, based upon interpretation of the report specification, multiple distinct queries that each correspond to one of the different layout areas of the chart, wherein the queries include (1) a chart data query to obtain chart data to be used for the chart and (2) one or more category data queries to obtain category aggregates for inclusion in the category label of the chart, wherein the category aggregates include supplemental values calculated based on the chart data;

retrieve the chart data for the chart data query;

retrieve the category aggregates for the one or more category data queries;

render the chart data, wherein the chart data is rendered into the chart at a location that is defined by the report specification;

render the category aggregates, wherein the category aggregates are rendered into the chart at a category location of the category label that is defined by the report specification; and display the category aggregates in the category location of the chart.

11. The non-transitory memory as claimed in claim 10, wherein the supplemental values comprise percentage values, calculated based on the chart data, for each category with respect to a total for all categories.

12. The non-transitory memory as claimed in claim 10, wherein the supplemental values comprise sum values, calculated based on the chart data, for all subcategory values of each category.

13. The non-transitory memory as claimed in claim 10, wherein the supplemental values comprise average values, calculated based on the chart data, for all subcategory values of each category.

* * * * *